(12) United States Patent
Wang et al.

(10) Patent No.: US 8,274,021 B2
(45) Date of Patent: Sep. 25, 2012

(54) FULLY INTEGRATED TEMPERATURE REGULATOR FOR BIOCHEMICAL APPLICATIONS

(75) Inventors: Hua Wang, Pasadena, CA (US); Seyed Ali Hajimiri, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 850 days.

(21) Appl. No.: 12/399,320

(22) Filed: Mar. 6, 2009

(65) Prior Publication Data

US 2010/0163545 A1  Jul. 1, 2010

Related U.S. Application Data

(60) Provisional application No. 61/068,514, filed on Mar. 7, 2008.

(51) Int. Cl.
*H05B 1/02* (2006.01)
(52) U.S. Cl. ......... 219/494; 219/497; 219/209; 219/501
(58) Field of Classification Search .................. 219/494, 219/497, 499, 209, 210, 501, 506
See application file for complete search history.

(56) References Cited

U.S. PATENT DOCUMENTS

| | | | | |
|---|---|---|---|---|
| 4,497,998 A * | 2/1985 | West | ............................. | 219/210 |
| 4,719,384 A * | 1/1988 | Hauden et al. | ................ | 310/343 |
| 5,354,967 A * | 10/1994 | Barzilai et al. | ................ | 219/225 |
| 5,369,245 A * | 11/1994 | Pickering | ........................ | 219/209 |
| 5,818,097 A * | 10/1998 | Rohlfing et al. | ............... | 257/468 |
| 6,127,661 A * | 10/2000 | Fry | ............................... | 219/497 |

* cited by examiner

*Primary Examiner* — Mark Paschall
(74) *Attorney, Agent, or Firm* — Milstein Zhang & Wu LLC; Joseph B. Milstein

(57) ABSTRACT

The invention is an integrated temperature regulator that can be fabricated using conventional semiconductor processing technology. The integrated temperature regulator can include a reaction chamber, for example fabricated from PDMS, in which chemical or biochemical reactions of interest can be carried out. The temperature regular can also be used to regulate the temperature of some circuits, e.g. an effective-inductance-change based magnetic particle sensor, to achieve a stable operation performance, such as an improved sensitivity. The integrated temperature regulator includes as subcomponents a temperature sensing circuit that receives a thermal signal from the vicinity of the reaction chamber, a temperature reference circuit, and a temperature control circuit that controls a heater based at least in part on the difference between the sensed temperature and the reference temperature. The various subcomponents can be programmable.

19 Claims, 8 Drawing Sheets

FULLY INTEGRATED TEMPERATURE REGULATOR FOR BIOCHEMICAL APPLICATIONS

CROSS-REFERENCE TO RELATED APPLICATIONS

This application claims priority to and the benefit of co-pending U.S. provisional patent application Ser. No. 61/068,514, filed Mar. 7, 2008, which application is incorporated herein by reference in its entirety.

STATEMENT REGARDING FEDERALLY FUNDED RESEARCH OR DEVELOPMENT

The U.S. Government has certain rights in this invention pursuant to Grant No. N00014-04-C-0588 awarded by ONR-Space and Naval Warfare Systems Center.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The invention relates to temperature control technology for chemical applications in general and particularly to a temperature control implementation that provides integrated control circuitry and heating elements that can be manufactured in a semiconductor processing environment.

2. Description of Related Art

Chemical and/or biochemical reactions are ubiquitous and fundamental subjects in both traditional chemistry and the emerging discipline of life science. In general, ambient temperature plays a vital role in characterizing a reaction process. First of all, based on classical chemical kinetics theory, both the reaction rate and the equilibrium constant are determined by temperature for a specific reaction. Moreover, in biochemistry, most reactants as well as enzymes and inhibitors are macro-molecules, whose functionalities are based on their 3-dimensional structures maintained by inter/intra molecular weak interactions, such as hydrogen bonds. Changing temperature, can break and re-form those bonds, and therefore, completely change the chemical activity of those macro-molecules. In research, tremendous attention has been paid to try to precisely regulate temperature for a chemical/biochemical reaction that is investigated. However, these temperature control approaches and designs involve external heating/cooling devices or require complicated micromachining processes to be implemented. A number of problems in response time and in precision of temperature control have been observed.

There is a need for temperature control technology that can provide faster and very precise temperature control.

SUMMARY OF THE INVENTION

In one aspect, the invention relates to an integrated temperature regulator. The integrated temperature regulator comprises a substrate having a surface; a temperature sensing circuit constructed on the surface, the temperature sensing circuit configured to sense a temperature in the vicinity of the substrate and to generate a temperature signal representative of the temperature; a temperature reference circuit constructed on the surface, the temperature reference circuit configured to generate a temperature-independent reference signal; a temperature control circuit constructed on the surface, the temperature control circuit in electrical communication with the temperature sensing circuit and the temperature reference circuit, the temperature control circuit configured to calculate and amplify a temperature difference between the temperature-independent reference signal and the temperature signal, and configured to provide as output a heater drive signal based at least in part on the calculated difference; and an electrical-thermal feedback loop comprising a heater and a reaction chamber, the electrical-thermal feedback loop configured to provide a thermal signal from the heater and the reaction chamber to the temperature sensing circuit, the heater and the reaction chamber configured to provide a thermal environment and a reaction environment, respectively, for a chemical or a biochemical reaction of interest.

In one embodiment, the substrate is a semiconductor wafer. In one embodiment, at least one of the temperature sensing circuit, the temperature reference circuit, the temperature control circuit, and the heater comprise a structure that is configured to be constructed using conventional silicon semiconductor processing technology. In one embodiment, the temperature sensing circuit is configured to provide a signal that is a monotonic function with respect to a sensed temperature. In one embodiment, the temperature sensing circuit comprises a proportional-to-absolute-temperature (PTAT) circuit. In one embodiment, the temperature sensing circuit is configured to provide a temperature signal having a programmable relation to the temperature that is sensed. In one embodiment, the temperature reference circuit is configured to receive an input signal provided by a temperature controlled source that does not vary as a temperature of the heater varies. In one embodiment, the temperature reference circuit is configured to provide a temperature reference signal that is programmable. In one embodiment, the temperature control circuit is configured to provide a control signal to maintain a temperature at a desired value different from ambient temperature when the calculated temperature difference between the temperature-independent reference signal and the temperature signal is substantially zero. In one embodiment, the temperature control circuit is configured to provide a heater drive signal that is programmable. In one embodiment, the heater is configured to circumscribe the temperature sensing circuit, the temperature reference circuit, and the temperature control circuit when viewed in a direction substantially normal to the surface of the substrate. In one embodiment, the heater is a resistance heater. In one embodiment, the heater is configured to have a desired shape and a desired dimension.

In one embodiment, the integrated temperature regulator of claim 1, further comprises electrical terminals configured to accept as input electrical power and command signals useful to operate each of the temperature sensing circuit, the temperature reference circuit, the temperature control circuit, and the heater, and to provide as output signals representative of one or more operating parameters of the integrated temperature regulator.

In one embodiment, the electrical-thermal feedback loop is configured to have negative feedback. In one embodiment, the electrical-thermal feedback loop having negative feedback further comprises an integration element configured to provide zero temperature regulating offset when an ambient temperature is changed or is different from a desired temperature. In one embodiment, the integrated temperature regulator further comprises a thermal isolation region around the substrate.

The invention can also be provided as an array comprising a plurality of ones of the integrated temperature regulator of claim 1, the array situated on the surface of the substrate.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

The temperature regulator technology described herein is fully integrated and does not need any external heating/cooling devices. This enables further high-level integration with other structures such as microfluidics. Moreover, the temperature regulator technology can control the temperature accurately within a miniaturized region. This leads to significantly reduced power consumption and to short response times and a high control precision in both the time and spatial domains. Most importantly, our design can be easily extended to a temperature controller array, where individual chemical/biochemical reaction chambers can have independent and reprogrammable temperatures. This invention addresses a wide range of possible applications, such as reaction process characterization and biochemical circuits. It is expected that standard semiconductor processing technology can be used to prepare the systems and devices of the invention. It is contemplated that systems and devices according to the invention can find use in hybrid lab-on-chip (LOC) for point-of-care (POC) medical diagnostic support applications.

First, we describe the invention at a fundamental level with all the core functional blocks addressed. We then describe several illustrative implementation variations. We provide the details of an illustrative design with simulation results and layout configurations.

We present a new method of regulating temperatures for chemical/biochemical applications. Our approach can be divided into four core blocks, including: 1. circuits to sense the absolute temperature with or without reprogrammable capability; 2. circuits to generate a temperature-independent reference signal with or without reprogrammable capability; 3. circuits to calculate and amplify the temperature deviation to provide suitable electrical signals for sensing and control; and 4. an electrical-thermal feedback loop comprising a heater and a reaction chamber. The electrical-thermal feedback loop can include a structure for regulating temperature, such as a sensor circuit.

Illustrative Embodiment

Figure 1:
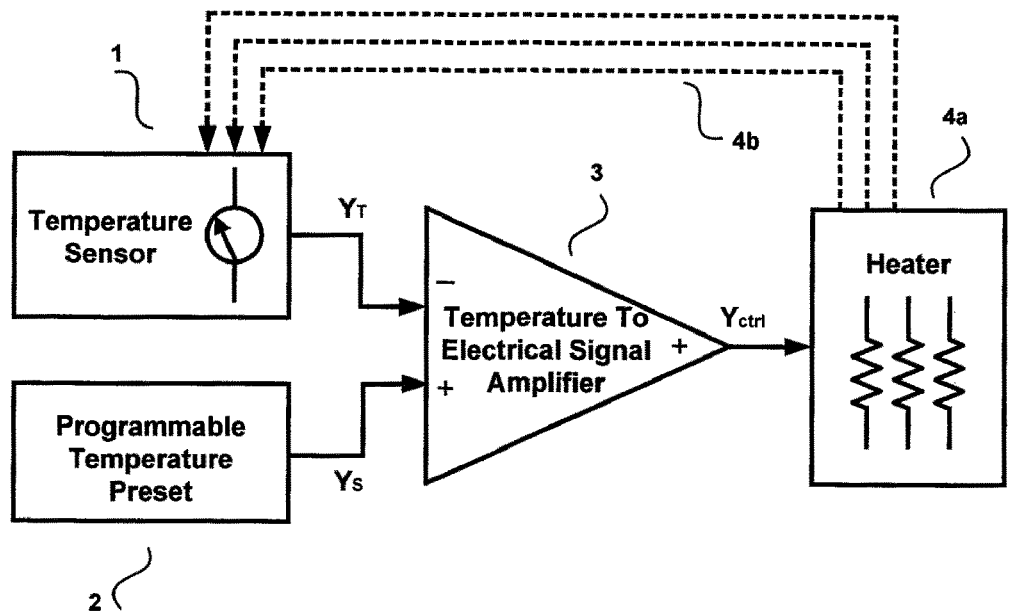
FIG. 1 is a schematic block diagram of an illustrative embodiment of the temperature regulator, according to principles of the invention.

FIG. 1 is a schematic block diagram of an illustrative embodiment of the temperature regulator. The method of operation is also described herein.

The temperature sensor, indicated as 1, receives a temperature signal that it uses to measure the absolute temperature of the regulated sample, and provides as output an electrical signal denoted as $Y_T$. The temperature signal received by the temperature sensor 1 can be any convenient signal, for example a conducted thermal signal. The temperature reference 2 provides as output a temperature independent electrical signal, $Y_S$, which indicates (or corresponds to) the programmed target temperature. The temperature to electrical signal amplifier 3, which can be a differential amplifier of any convenient type, obtains a difference signal representing the difference between $Y_T$ and $Y_S$, amplifies the difference signal, and provides as output a control signal $Y_{ctrl}$ to control the heater 4a. Note that both $Y_T$ and $Y_S$ can be in the form of either voltage, current, or power. Both $Y_T$ and $Y_S$ can be either differential or single-ended and either analog or digital in nature. The heater 4a generates heat according to the value of $Y_{ctrl}$. This generated heat flow conducts through a thermal pathway 4b which includes the heater, designed sample chamber, and the chip substrate and eventually dissipates to the environment. Based on the design of this thermal path, a new temperature value is set at the sample, which is again sensed by the temperature sensor 1. This completes the thermal-electrical feedback path.

In other alternative embodiments, the temperature signal received by the temperature sensor 1 could be any of a signal from a thermocouple, a signal from a thermistor, or a signal from a pyrometric detector.

The electrical-thermal feedback loop can also comprise the substrate itself and/or some electrical circuits on the substrate, such as a biosensor circuit, e.g. the effective-inductance-change based magnetic particle sensor described in co-pending application U.S. Ser. No. 61/068,513, the entire contents of which application are incorporated herein by reference for all purposes. The temperature controller can therefore stabilize the temperature of the substrate and/or the circuits on the substrate. This could provide a stable operation of the circuits or other circuits on the substrate to achieve a better performance, such as a better sensitivity/lower drifting/lower noise floor for biosensors.

By using the negative feedback and by programming the feedback loop to have a high loop-gain, the temperature regulator can more precisely control the temperature that one wants to regulate. This also achieves a lower temperature regulating offset residual when the ambient temperature is changed or is different from the target temperature set for the regulator.

By using an effective integration element in the negative feedback loop, such an integrator in the digital domain, with some loop dynamics stabilizer, such as electrical or thermal filters, a higher order thermal loop can be achieved which will have zero temperature regulating offset at the regulator's operation when the ambient temperature is changed or is different from the target temperature set for the regulator.

By designing the heater layout geometry both in shape (e.g. circular or square with/without some island structures in the middle) and dimension, a very homogeneous regulated temperature profile can be achieved for the location of concern, such as the reaction chamber, the surface of the substrate or the target electrical circuit for temperature regulating.

By choosing the substrate shape and material, by providing thermal isolation around the substrate (top and/or peripheral and/or bottom), and/or adjusting the temperature-to-heater power gain in the electrical-thermal loop, the temperature regulator can be designed with a very fast response and quick temperature settling for a temperature regulation operation.

Possible Implementation Variations

We now describe several implementation variations for the aforementioned elements of the illustrative temperature regulators. The designs provided are examples for purposes of illustration, and other alternatives that might be implemented are also contemplated, so that any chemical/biochemical temperature regulator based on the operational mechanisms described herein are also contemplated.

Temperature Sensor 1

The output $Y_T$ of temperature sensor 1 can be implemented as any monotonic function with respect to the temperature. The small signal gain can be defined mathematically, as expressed in Eq. (1). In particular, a linear relationship can be designed which will give a constant small signal gain as a function of temperature.

$$Gain_{sensor} = \frac{\partial Y_T}{\partial T} \qquad \text{Eq. (1)}$$

Figure 2:
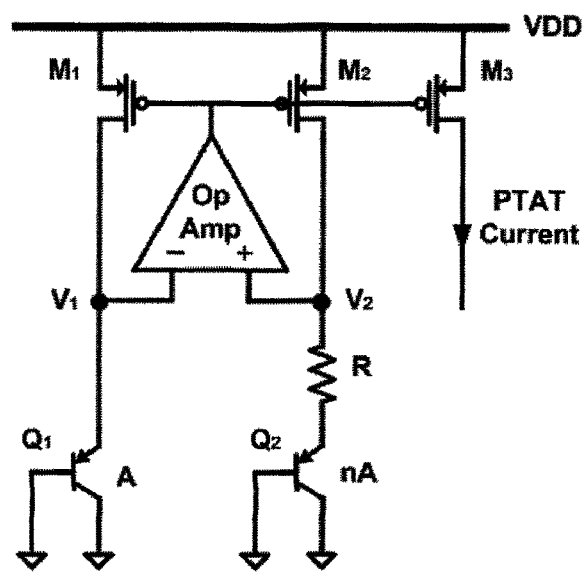
FIG. 2 is circuit diagram for an illustrative PTAT current generation circuit that provides a current signal proportional to temperature.

One circuit that can be used to provide such capability is the PTAT (proportional to absolute temperature) circuit. In one embodiment, the PTAT circuit shown in FIG. 2 can be utilized for the purpose of temperature sensing.

Due to the matching between transistors $M_1$ and $M_2$, the collector current through $Q_1$ and $Q_2$ are the same. Those of skill in the circuit arts will recognize that the operational amplifier causes equal voltage values to appear at nodes $V_1$ and $V_2$. The collector current can be derived as $$\frac{V_T \ln(n)}{R} = \frac{KT \ln(n)}{qR}.$$

Figure 3:
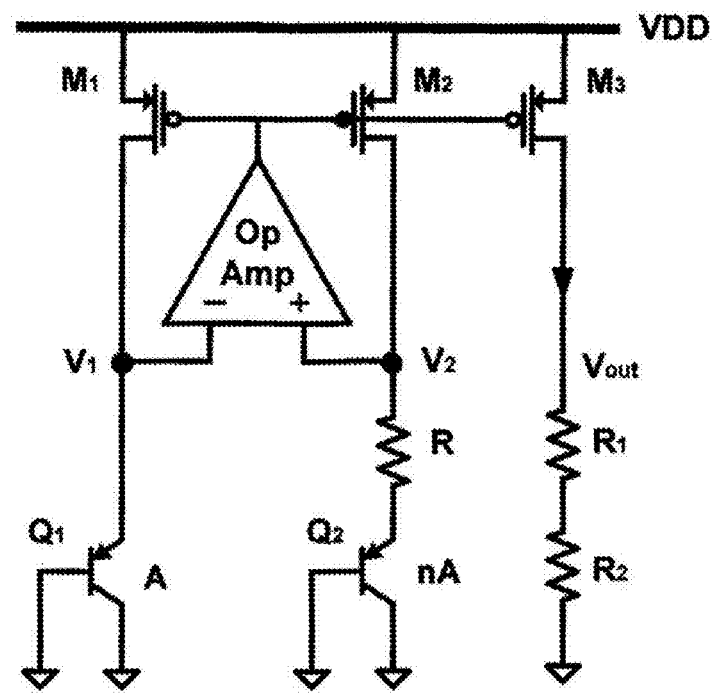
FIG. 3 is circuit diagram for an illustrative PTAT voltage generation circuit that provides a voltage signal proportional to temperature.

This PTAT current can be converted to a proportional PTAT voltage by adding a resistive load at $M_3$ shown in FIG. 3.

In FIG. 3, the values of resistors $R_1$ and $R_2$ can be tuned to have positive/negative/zero temperature coefficients depending on the specific application that one intends to implement.

Temperature Reference 2

Figure 4:
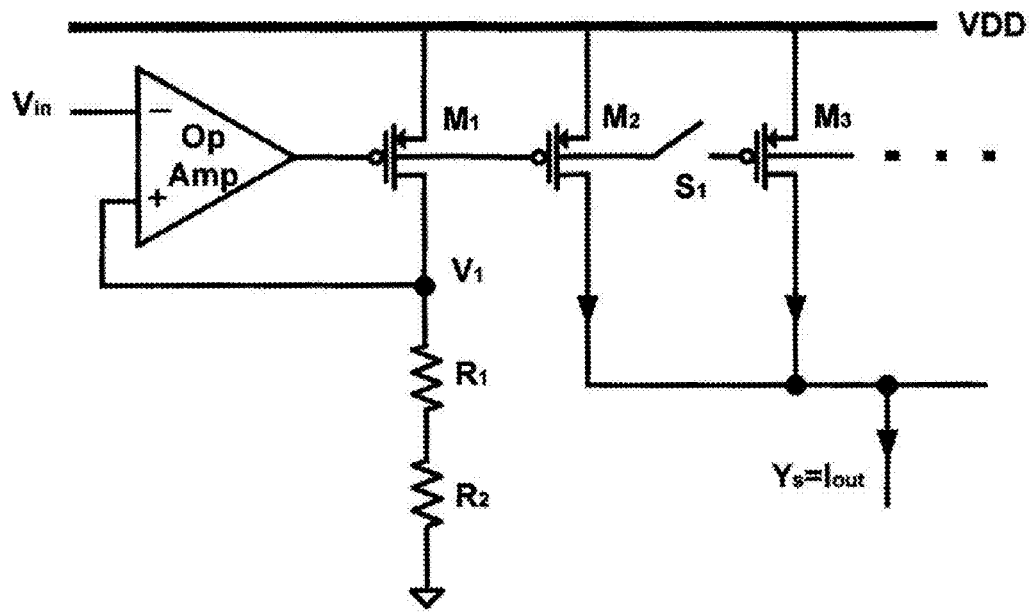
FIG. 4 is a circuit diagram of an illustrative temperature reference circuit that provides a reference signal $Y_S$ in the form of a current.

In general, as long as the difference $Y_S - Y_T$ has enough monotonic gain with respect to temperature, the regulator can always be functional. In particular, the temperature reference signal $Y_S$ can be designed to be temperature-independent and programmable. The provision of $Y_S$ as a voltage signal is readily achieved through widely used band-gap circuitry. FIG. 4 is a circuit diagram of an illustrative temperature reference circuit that provides a reference signal $Y_S$ in the form of a current.

In the temperature reference 2, the operational amplifier forces $V_1$ to equal $V_{in}$. One assumes for this analysis that $V_{in}$ is temperature independent. For example, $V_{in}$ can be provided by a temperature controlled source that does not vary as the temperature of the specimen of interest varies. Therefore, if $R_1$ and $R_2$ are tuned to have a substantially zero temperature coefficient, the current through transistor $M_1$ will also be temperature independent. This current is mirrored through a current source array shown by transistor $M_2$ and transistor $M_3$. The total output current can be further set by using the switch, e.g., $S_1$, and additional transistors $M_n$ and switches $S_n$, not shown.

Temperature to Electrical Signal Amplifier 3

Temperature to electrical signal amplifier 3 takes the difference of the two inputs $Y_S$ and $Y_T$ and amplifies the difference signal to a suitable level to provide a signal large enough to drive the heater. An offset may be provided to cause the driving signal to be non-zero under conditions that $Y_S = Y_T$, e.g., to provide a control signal to maintain a temperature at a desired value different from ambient temperature. That is, if $Y_S$ were to correspond to a desired temperature of 39° C. at a sample of interest, and ambient temperature happened to be 20° C., a drive signal would be required to raise the temperature in the vicinity of the sample of interest to the desired 39° C. The temperature controller would then increase power as the temperature of the sample of interest fell below 39° C. and would decrease the power as the temperature of the sample of interest rose above 39° C. Note that the gain is preferred to be programmable to control the loop gain of the thermal-electrical feedback.

One or a cascade of ordinary differential amplifiers can be used as temperature to electrical signal amplifier 3 if the inputs are in voltage form. If the inputs are in current format, current mirrors can be used directly for this amplification purpose, shown in FIG. 5.

Figure 5:
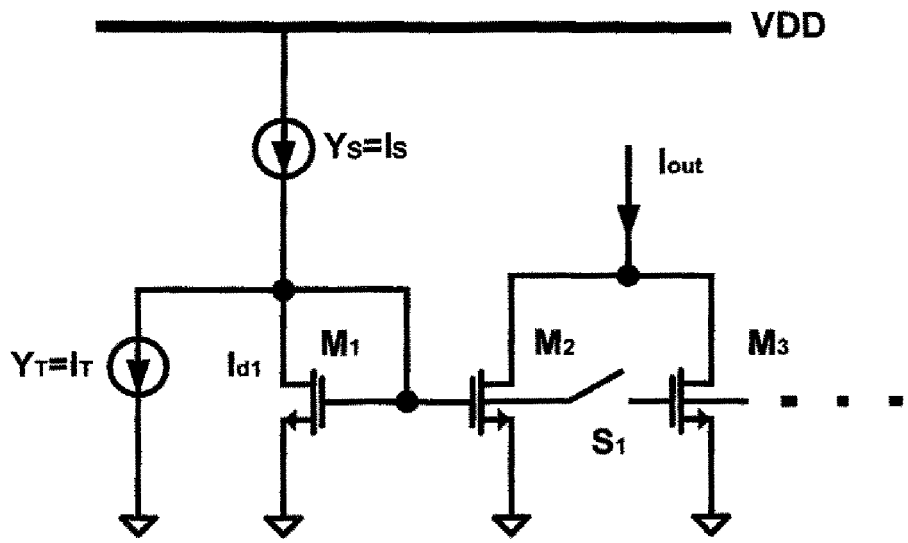
FIG. 5 is a circuit diagram of an illustrative temperature-to-electrical-signal amplifier circuit that provides a drive signal $I_{out}$ in the form of a current.

FIG. 5 is a circuit diagram of an illustrative temperature-to-electrical-signal amplifier circuit that provides a drive signal $I_{out}$ in the form of a current. In this configuration, the drain current of the transistor $M_1$ is $I_{d1} = I_S - I_T$. This current is amplified through a current mirror array, denoted by $M_2$ and $M_3$. Switches, such as $S_1$, can be used to set the current amplification gain.

Electrical Thermal Feedback Loop 4a and 4b

This is a feedback loop which converts the electrical signals back to the thermal domain and completes the loop to make the temperature controller operative.

In various embodiments, the heater can be designed as big power transistor arrays, resistor arrays or a combination of the two. The important issue is the layout of the heater structure. Heaters with different geometry that consuming the same DC power will generate different temperature profiles that determine important performance parameters, such as maximum temperature $T_{max}$, and the homogeneity of the temperature distribution. In one embodiment, a heater having a ring structure (or a structure having heaters located at the periphery of an area, for example circumscribing the temperature sensor 1, the temperature reference 2, and the temperature to electrical signal amplifier 3) can be used where both the chamber and the temperature sensing circuitry can be encircled in the middle.

The chamber can be implemented in various technologies. In one embodiment, a low-cost polydimethylsiloxane (PDMS) based chamber can be used to deliver and hold the samples.

Array Configuration

Figure 6:
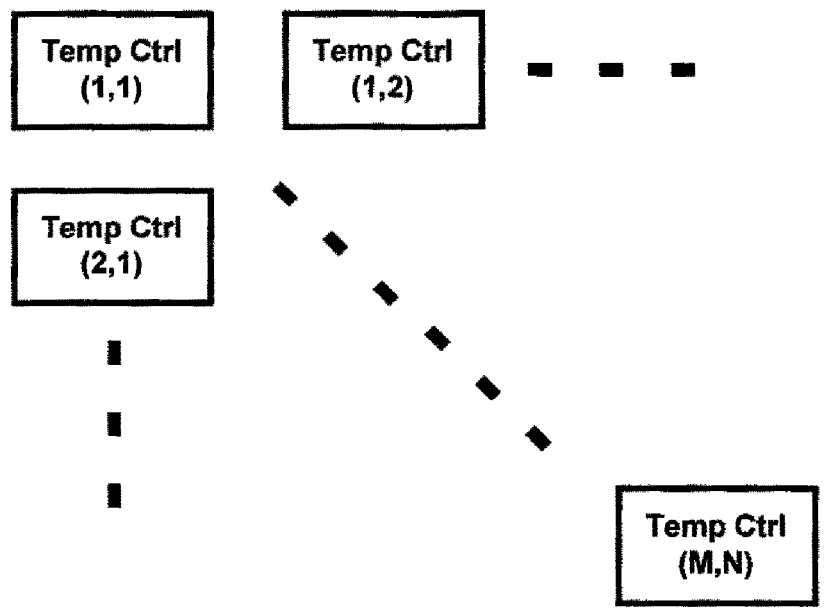
FIG. 6 is a schematic diagram that illustrates how a plurality of temperature controllers can be provided in an array.

The temperature controller can be extended to an array of temperature controllers for a system that provides a plurality of controlled areas or reaction chambers, as shown in FIG. 6. In FIG. 6, an M row by N column rectangular or square array is depicted. Equally well, the shape of an individual heater can be any convenient shape, such as area-filling regular shapes (e.g., squares, triangles, hexagons) or other shapes (circles, mixed shapes).

By precisely controlling the temperature of M×N local regions, a programmable temperature distribution can be generated on the global sense with the superposition of all the M×N temperature profiles. This can be used for biochemical circuit applications.

A Design Example

In this section, we present an illustrative design for a temperature controller.

Figure 7:
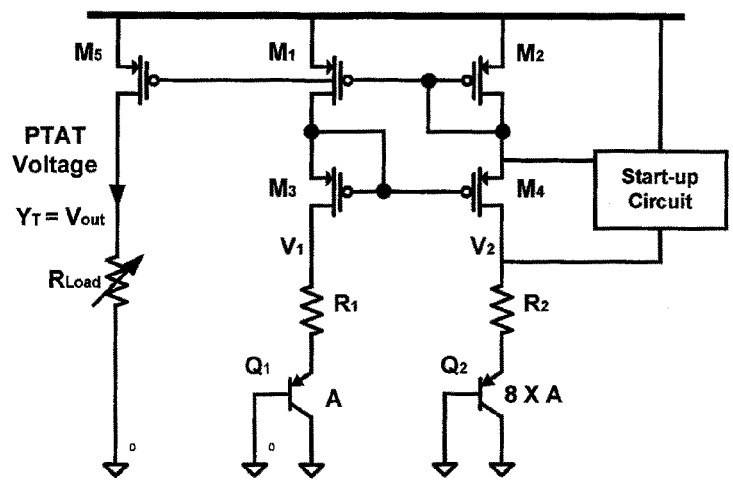
FIG. 7 is a circuit diagram of an illustrative temperature sensing and bandgap circuit.

In this embodiment, the temperature sensing and bandgap circuits can be combined together, shown in FIG. 7.

In FIG. 7, the floating current mirror using transistors $M_1$ through $M_4$ ensures that $V_1 = V_2$ and $Q_1$ and $Q_2$ shares the same collector currents. Therefore, this collector current can be shown as a PTAT current as given by Eq. (2).

$$I_c = \frac{V_T \ln(n)}{R_2 - R_1} \quad \text{Eq. (2)}$$

The voltage V2 is given by Eq. (3), which can be provided as a bandgap voltage (e.g., independent of temperature).

$$V_2 = \frac{R_2}{R_2 - R_1} V_T \ln(n) + V_{be} \quad \text{Eq. (3)}$$

Figure 8:
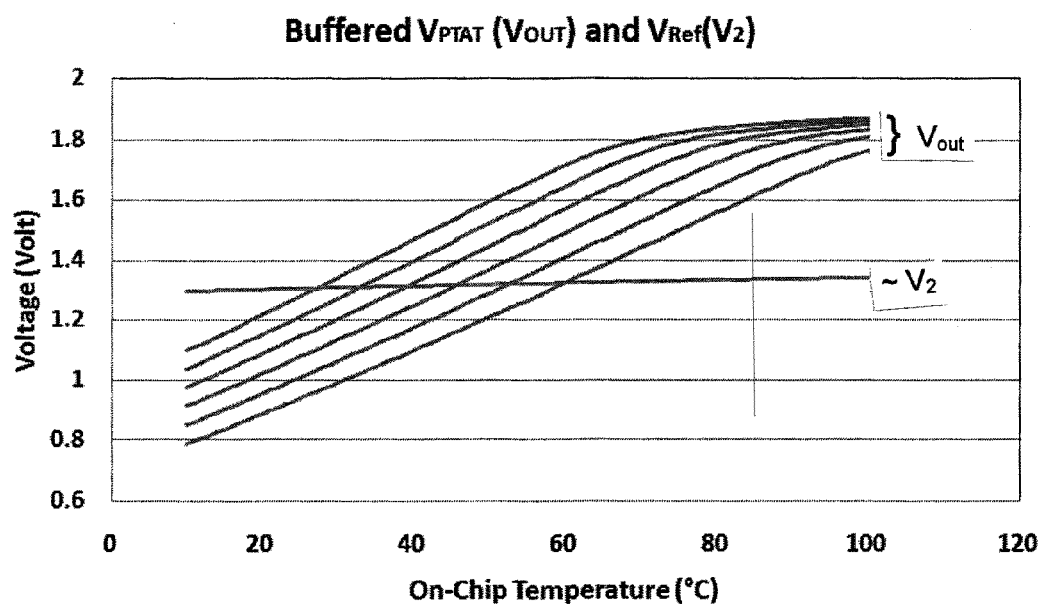
FIG. 8 is a graph that shows the simulated values for $V_{out}$ and $V_2$ for one design embodiment.

The PTAT current is mirrored through $R_{Load}$. Here, $R_{load}$ is chosen to have positive temperature coefficient (e.g., the resistance vs. temperature behavior typical of metals) to enhance the temperature-to-electrical conversion gain. The tuning ability is achieved by implementing $R_{load}$ as a digital programmable resistor. The simulated behavior of $V_{out}$ and $V_2$ for the circuit are shown in FIG. 8.

The crossing points of each of the lines denoting $V_{out}$ and the line denoting $V_2$ are the target temperatures for regulating the operation of the system. The multiple lines representing $V_{out}$ show the capability of temperature setting.

After suitable DC conversion, the two voltages are fed into a two-stage differential amplifier block. The second stage together with the heater array is shown in detail in FIG. 9.

Figure 9:
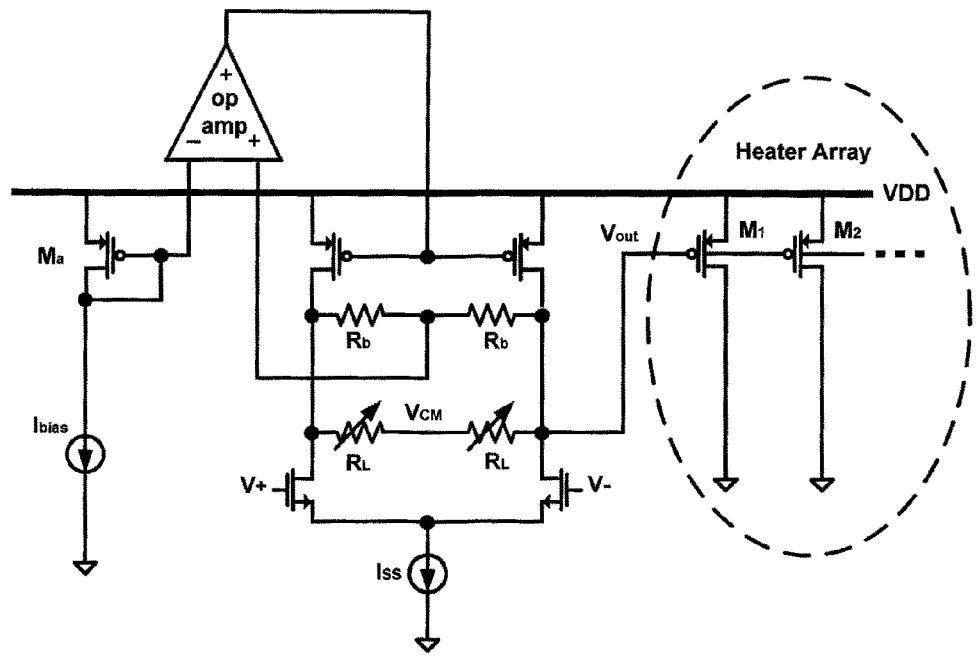
FIG. 9 is an illustrative circuit diagram that shows one embodiment of the $2^{nd}$ stage of the amplifier together with a heater array.
Figure 10:
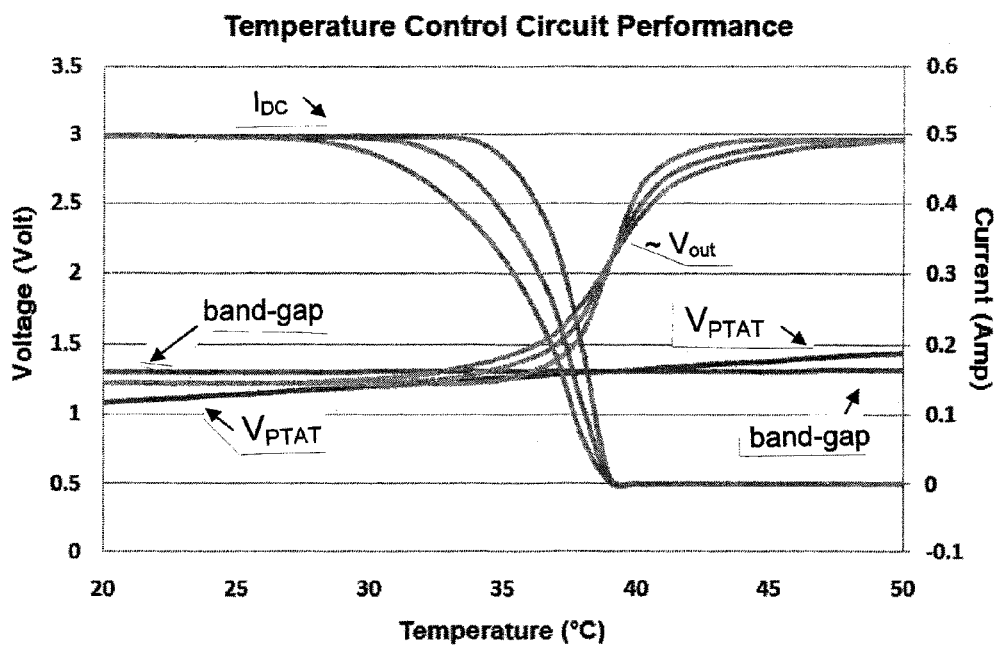
FIG. 10 is a graph that shows the temperature controlling circuit performance.

In FIG. 9, $M_a$ is identical to the unit transistor used in the heater array ($M_1, M_2 \ldots$). By biasing at a very small current (of the order of 1 μA), the gate voltage of $M_a$ is close to its threshold voltage. The op-amp feedback circuit is used to force the common mode voltage of this stage to track the threshold voltage of $M_a$. Therefore, the output voltage $V_{out}$ will be able to turn on the heater array only when input voltage swing, $V_+ - V_-$, is less than zero, which will be determined by the preceding stages. $R_{load}$ is designed to be digitally programmable to control the gain. The performance of the driver stage and the heater is shown in FIG. 10.

The band-gap and PTAT voltages show that the target temperature is 39° C. (e.g., their crossing point). The curves that depict the $V_{out}$ to control the heater shown in FIG. 9 also have a crossing point in the vicinity of 39° C. The curves labeled $I_{DC}$ show the DC current drawn by the heater from a 2.6V supply, and all go to zero at approximately 39° C. A set of three curves for both the $V_{out}$ and $I_{DC}$ parameters illustrate the gain tuning capability.

Figure 11:
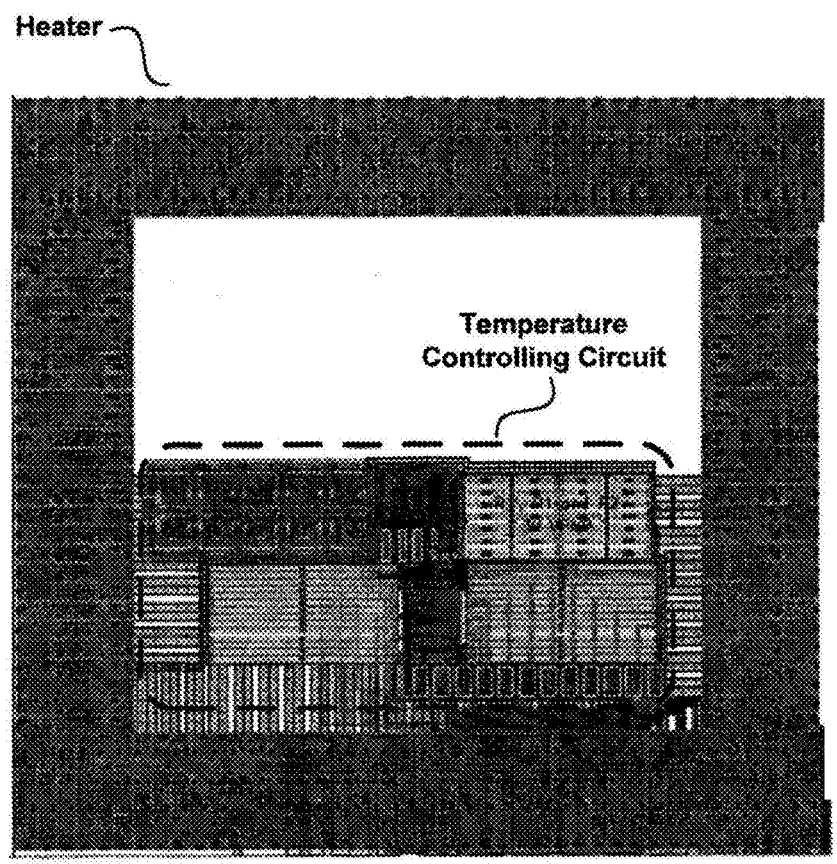
FIG. 11 is a diagram that illustrates the layout of the heater and the temperature controlling circuit in a rectangular structure.

FIG. 11 shows the layout of the heater together with the temperature controlling circuit. In the embodiment shown in FIG. 11, the length of the heater is 220 μm. The height of the heater is 200 μm. The width of the heater ring is 30 um. The rectangular loop structure of the heater cells provides sufficient temperature homogeneity. The sensing/controlling circuit is placed in the middle of the heater to accurately measure the temperature. The temperature profile simulation results are shown in FIG. 12, FIG. 13 and FIG. 14.

Figure 12:
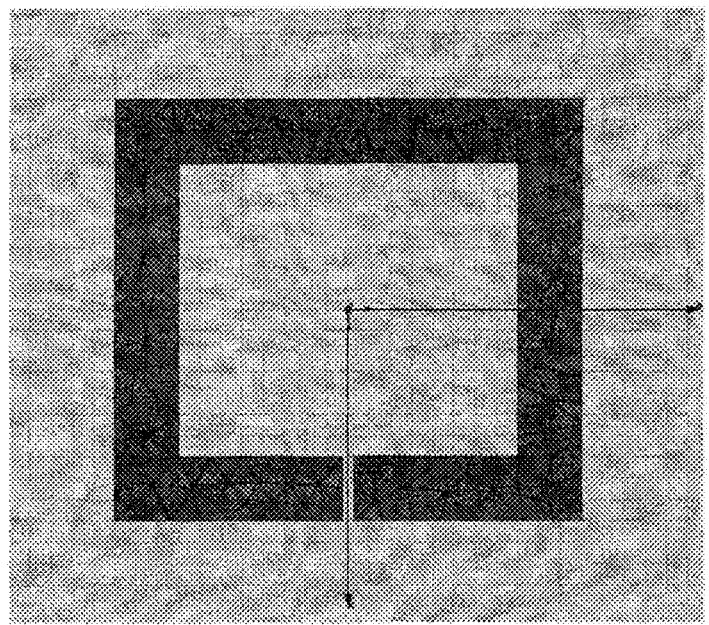
FIG. 12 is a diagram that illustrates the finite element mesh of the heater ring.

FIG. 12 is a diagram that illustrates the finite element mesh of the heater ring.

Figure 13:
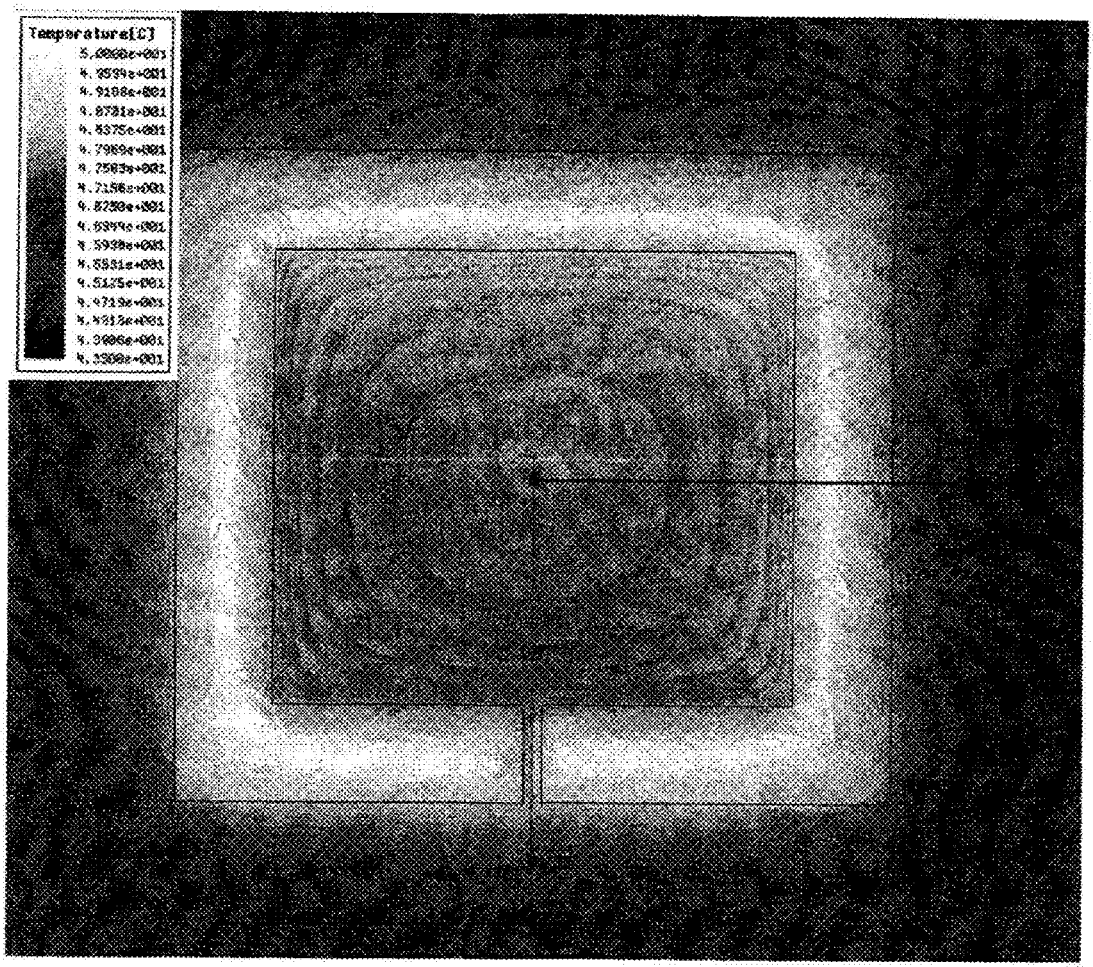
FIG. 13 is a diagram that illustrates the temperature profile of the heater ring with the ambient temperature of 27° C. and heater power of 350 mW. The plotting temperature range is 43.5° C. to 50° C.

FIG. 13 is a diagram that illustrates the temperature profile of the heater ring with the ambient temperature of 27° C. and heater power of 350 mW. The plotting temperature range is 43.5° C. to 50° C.

Figure 14:
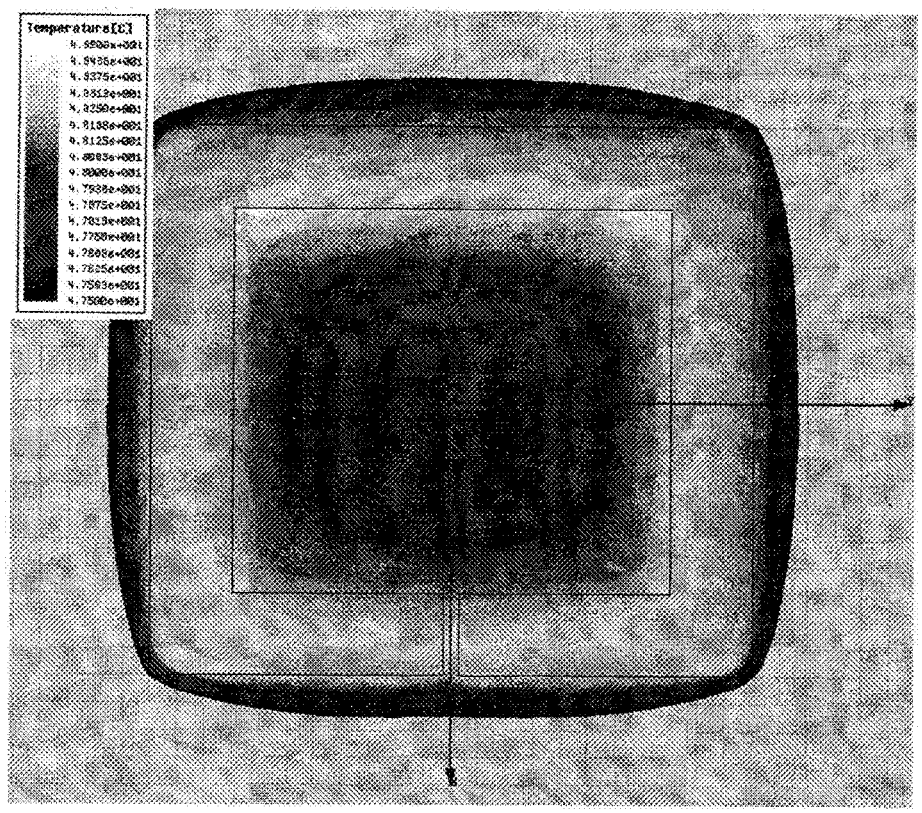
FIG. 14 is another diagram that illustrates the temperature profile of the heater ring with the ambient temperature of 27° C. and heater power of 350 mW. The plotting temperature range is 47.5° C. to 48.5° C.

FIG. 14 is another diagram that illustrates the temperature profile of the heater ring with the ambient temperature of 27° C. and heater power of 350 mW. The plotting temperature range is 47.5° C. to 48.5° C. As shown in FIG. 14, the temperature difference within the heater ring is less than 0.9° C.

Fabrication Procedure

One recognizes that the devices described require power to perform the control and heating functions. Therefore, one possible fabrication procedure that can be envisioned would include beginning with a silicon wafer or a silicon-on-insulator (SOI) wafer and laying out and building one or more control circuit array elements each comprising the temperature sensor 1, the temperature reference 2, and the temperature to electrical signal amplifier 3, along with the necessary power and control traces needed to operate each such control circuit. One would then deposit a thin insulating layer, such as a few nanometers of silicon oxide or other desired insulator over the array and the power and control traces and define therein or thereon the locations of the heater elements and the locations of openings to electrically connect the heater elements to the control circuits. One would then deposit the heater elements, for example using metal such as tungsten having a positive temperature coefficient of resistance, and provide the interconnects between the control circuits and the heaters.

The PDMS-based micro-fluidic reaction chamber can be placed on top of the heater ring structure. The bottom PDMS layer is designed to be of submicron thickness, which helps to assure the close temperature tracking between the chamber and the silicon chip.

In order to operate the devices describe, one would provide suitable sources of electrical power of conventional nature, suitable sources of chemical reagents and/or biochemical materials of interest to be processed, and circuitry and input/output devices to allow a user to issue commands and to have displayed, recorded, and/or delivered the results of operation of the devices described herein. Results can include either or both of information about the reaction or materials of interest that are processed by operation of the devices described, and the physical result in the form of material of interest processed by operation of the devices described.

Derivation of Feedback Loop Characteristics

The complete thermal-electrical loop gain can be derived and calculated to be approximately 29 dB at the maximum amplifier gain, as is shown below. The dominant pole of this loop is the thermal pole located at a frequency measured in kHz. All the other poles and zeros due to the electrical circuits are above tens of MHz. This yields a first order loop. The feedback loop will always remain stable with a loop gain of about 20 to 30 dB.

Based on the Fourier heat transfer equation Eq. (4), we can approximate it into a one dimensional case with a coefficient of $K_{eff}$, as shown in Eq. (5).

$$\frac{\partial Q_{transfer}}{\partial t} = -K \oiint_S \nabla T \cdot dS \qquad \text{Eq. (4)}$$

$$P_{dissipation} = K_{eff}(T_{chip} - T_{ambient}) \qquad \text{Eq. (5)}$$

We assume that the temperature control circuit has the characteristics of Eq. (6). Coefficient A is the temperature to power gain.

$$P_{generated} = P_a + A(T_{set} - T_{chip}) \qquad \text{Eq. (6)}$$

$P_0$ is the stand-by power consumption, and it maintains a basic temperature difference between the chip and the environment. Also, when the chip only consumes $P_0$, the on-chip temperature should be $T_{set}$. We represent the environment temperature as $T_H$. This can be mathematically as shown in Eq. (7).

$$P_0 = K_{eff}(T_{set} - T_H) \qquad \text{Eq. (7)}$$

Therefore, equation (6) can be rewritten as Eq. (8).

$$P_{generated} = P_0 + A(T_{set} - T_{chip}) \qquad \text{Eq. (8)}$$
$$= P_0 + A\left(\frac{P_0}{K_{eff}} + T_H - T_{chip}\right)$$

By conservation of total energy, we have Eq. (9).

$$P_{absorb} = P_{generated} - P_{dissipation} \qquad \text{Eq. (9)}$$
$$= P_0 + A\left(\frac{P_0}{K_{eff}} + T_H - T_{chip}\right) - K_{eff}(T_{chip} - T_{ambient})$$
$$= C_{eff} M_{eff} \frac{\partial T_{chip}}{\partial t}$$

We assume there is a step response of the ambient temperature as in Eq. (10).

$$T_{ambient}(t) = T_{ambient}(0) + \Delta T \cdot u(t) \quad t \geq 0 \qquad \text{Eq. (10)}$$

The on chip temperature can be solved by combining Eq. (9) and Eq. (10).

$$T_{chip} = \frac{K_{eff} \Delta T}{K_{eff} + A}\left[u(t) - \exp\left(-\frac{K_{eff} + A}{C_{eff} M_{eff}} t\right)\right] + \qquad \text{Eq. (11)}$$
$$\frac{P_0 + K_{eff} T_{ambient}(0) + A\left(\frac{P_0}{K_{eff}} + T_H\right)}{K_{eff} + A} \quad t \geq 0$$

The on-chip temperature at different times can be further calculated based on Eq. (11)

At $t = 0^-$ \qquad Eq. (12)
$T_{ambient} = T_{ambient}(0)$
$$T_{chip} = \frac{P_0}{K_{eff}} + T_H - \frac{K_{eff}[T_H - T_{ambient}(0)]}{K_{eff} + A}$$

At $t = 0^+$ \qquad Eq. (13)
$T_{ambient} = T_{ambient}(0) + \Delta T$
$$T_{chip} = \frac{P_0}{K_{eff}} + T_H - \frac{K_{eff}[T_H - T_{ambient}(0)]}{K_{eff} + A}$$

and

At $t = \infty$ \qquad Eq. (14)
$T_{ambient} = T_{ambient}(0) + \Delta T$
$$T_{chip} = \frac{P_0}{K_{eff}} + T_H - \frac{K_{eff}[T_H - T_{ambient}(0) - \Delta T]}{K_{eff} + A}$$
$$= T_{chip}(0) + \frac{K_{eff}}{K_{eff} + A} \Delta T$$

We can define $\Delta T_{chip}$ as $$\Delta T_{chip} = \frac{K_{eff}}{K_{eff} + A} \Delta T \qquad \text{Eq. (15)}$$

This quantity $\Delta T_{chip}$ indicates the residual temperature offset due to finite feedback loop gain. When the loop gain becomes very large, e.g., $A/K_{eff} \to \infty$, we will have $\Delta T_{chip} \approx 0$.

Figure 15:
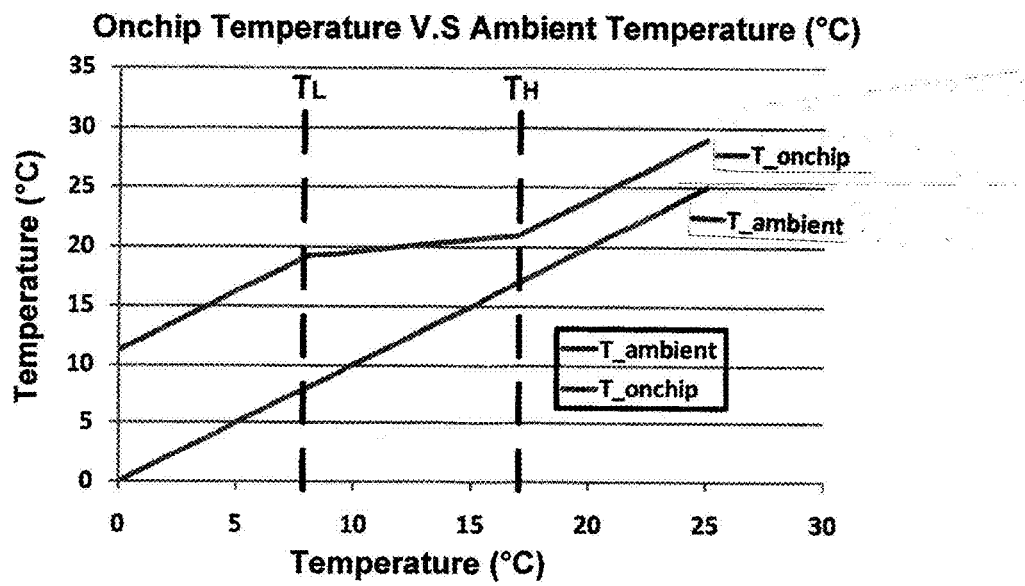
FIG. 15 is a graph that shows the estimated on-chip temperature vs. ambient temperature.

The trend of the temperature performance is illustrated in FIG. 15.

At $T_{ambient} = T_L$ \qquad Eq. (16)
$$T_{chip} = \frac{P_0}{K_{eff}} + T_H - \frac{K_{eff}[T_H - T_L]}{K_{eff} + A}$$

and $$P_{chip} = P_0 + \frac{A K_{eff}[T_H - T_L]}{K_{eff} + A} \qquad \text{Eq. (17)}$$

At $T_{ambient} = T_H$ \qquad Eq. (18)
$$T_{chip} = T_{set} = \frac{P_0}{K_{eff}} + T_H$$

and $$P_{chip} = P_0 \qquad \text{Eq. (19)}$$

Theoretical Discussion

Although the theoretical description given herein is thought to be correct, the operation of the systems and devices described and claimed herein does not depend upon the accuracy or validity of the theoretical description, but rather on the ability to make and use the systems and devices according to the methods and procedures described. That is, later theoretical developments that may explain the observed results on a basis different from the theory presented herein will not detract from the inventions described herein.

While the present invention has been particularly shown and described with reference to the structure and methods disclosed herein and as illustrated in the drawings, it is not confined to the details set forth and this invention is intended to cover any modifications and changes as may come within the scope and spirit of the following claims.

What is claimed is:

1. An integrated temperature regulator, comprising:
a substrate having a surface;
a temperature sensing circuit constructed on said surface, said temperature sensing circuit configured to sense a temperature in the vicinity of said substrate and to generate a temperature signal representative of said temperature;
a temperature reference circuit constructed on said surface, said temperature reference circuit configured to generate a temperature-independent reference signal;
a temperature control circuit constructed on said surface, said temperature control circuit in electrical communication with said temperature sensing circuit and said temperature reference circuit, said temperature control circuit configured to calculate and amplify a temperature difference between said temperature-independent reference signal and said temperature signal, and configured to provide as output a heater drive signal based at least in part on said calculated difference; and
an electrical-thermal feedback loop comprising a heater and a reaction chamber, said electrical-thermal feedback loop configured to provide a thermal signal from said heater and said reaction chamber to said temperature sensing circuit, said heater and said reaction chamber configured to provide a thermal environment and a reaction environment, respectively, for a chemical or a biochemical reaction of interest.

2. The integrated temperature regulator of claim 1, wherein said substrate is a semiconductor wafer.

3. The integrated temperature regulator of claim 1, wherein at least one of said temperature sensing circuit, said temperature reference circuit, said temperature control circuit, and said heater comprise a structure that is configured to be constructed using conventional silicon semiconductor processing technology.

4. The integrated temperature regulator of claim 1, wherein said temperature sensing circuit is configured to provide a signal that is a monotonic function with respect to a sensed temperature.

5. The integrated temperature regulator of claim 1, wherein said temperature sensing circuit comprises a proportional-to-absolute-temperature circuit.

6. The integrated temperature regulator of claim 1, wherein said temperature sensing circuit is configured to provide a temperature signal having a programmable relation to said temperature that is sensed.

7. The integrated temperature regulator of claim 1, wherein said temperature reference circuit is configured to receive an input signal provided by a temperature controlled source that does not vary as a temperature of said heater varies.

8. The integrated temperature regulator of claim 1, wherein said temperature reference circuit is configured to provide a temperature reference signal that is programmable.

9. The integrated temperature regulator of claim 1, wherein said temperature control circuit is configured to provide a control signal to maintain a temperature at a desired value different from ambient temperature when said calculated temperature difference between said temperature-independent reference signal and said temperature signal is substantially zero.

10. The integrated temperature regulator of claim 1, wherein said temperature control circuit is configured to provide a heater drive signal that is programmable.

11. The integrated temperature regulator of claim 1, wherein said heater is configured to circumscribe said temperature sensing circuit, said temperature reference circuit, and said temperature control circuit when viewed in a direction substantially normal to said surface of said substrate.

12. The integrated temperature regulator of claim 1, wherein said heater is a resistance heater.

13. The integrated temperature regulator of claim 1, wherein said heater is configured to have a desired shape and a desired dimension.

14. The integrated temperature regulator of claim 1, wherein said reaction chamber comprises polydimethylsiloxane.

15. The integrated temperature regulator of claim 1, further comprising electrical terminals configured to accept as input electrical power and command signals useful to operate each of said temperature sensing circuit, said temperature reference circuit, said temperature control circuit, and said heater, and to provide output signals representative of one or more operating parameters of said integrated temperature regulator.

16. The integrated temperature regulator of claim 1, wherein said electrical-thermal feedback loop is configured to have negative feedback.

17. The integrated temperature regulator of claim 16, wherein said electrical-thermal feedback loop having negative feedback further comprises an integration element configured to provide zero temperature regulating offset when an ambient temperature is changed or is different from a desired temperature.

18. The integrated temperature regulator of claim 1, further comprising a thermal isolation region around said substrate.

19. An array comprising a plurality of ones of said integrated temperature regulator of claim 1, said array situated on said surface of said substrate.

* * * * *